US009824878B1

(12) United States Patent
Su

(10) Patent No.: US 9,824,878 B1
(45) Date of Patent: Nov. 21, 2017

(54) CERAMIC METAL HALIDE LAMP

(71) Applicant: Robert Su, Chino, CA (US)

(72) Inventor: Robert Su, Chino, CA (US)

( * ) Notice: Subject to any disclaimer, the term of this patent is extended or adjusted under 35 U.S.C. 154(b) by 0 days.

(21) Appl. No.: 15/448,564

(22) Filed: Mar. 2, 2017

Related U.S. Application Data

(63) Continuation-in-part of application No. 15/368,654, filed on Dec. 4, 2016.

(51) Int. Cl.
*H01J 31/14* (2006.01)
*H01J 61/82* (2006.01)
*H01J 61/34* (2006.01)
*H01J 61/36* (2006.01)
*A01G 9/20* (2006.01)
*A01G 7/04* (2006.01)
*H01J 9/32* (2006.01)
*H01J 9/39* (2006.01)
*H01J 9/24* (2006.01)

(52) U.S. Cl.
CPC ............ *H01J 61/827* (2013.01); *A01G 7/045* (2013.01); *A01G 9/20* (2013.01); *H01J 61/34* (2013.01); *H01J 61/366* (2013.01); *H01J 9/247* (2013.01); *H01J 9/323* (2013.01); *H01J 9/39* (2013.01)

(58) Field of Classification Search
CPC ........ H01J 61/827; H01J 61/34; H01J 61/366; H01J 9/247; H01J 9/323; H01J 9/39; A01G 7/045; A01G 9/20
See application file for complete search history.

(56) References Cited

U.S. PATENT DOCUMENTS 4,751,432 A * 6/1988 Van Delm ............... H01J 61/34 315/178
5,142,188 A * 8/1992 Ravi ..................... H01J 61/825 313/25
5,661,367 A * 8/1997 Fellows .................. H01J 61/34 313/25
2002/0067132 A1* 6/2002 Takeda .................. H01J 61/125 315/99
2009/0015162 A1* 1/2009 Bernard .................... H01J 5/48 313/625
2014/0354175 A1* 12/2014 Iida ....................... H01J 61/827 315/291

FOREIGN PATENT DOCUMENTS

CN 205488033 * 8/2016 .............. H01J 61/02

* cited by examiner

*Primary Examiner* — Donald Raleigh
(74) *Attorney, Agent, or Firm* — Raymond Y. Chan; David and Raymond Patent Firm

(57) ABSTRACT

A ceramic metal halide lamp includes a luminous tube; an illuminating arrangement having at least two illuminators serially connected with each other and deposed inside the luminous tube; and at least one retainer having at least contacting one end being contacted with an inner surface of the luminous tube to support the illuminators being stability located at a predetermined position inside said luminous tube, wherein the two illuminators are serially connected with each other along a central line of said luminous tube.

7 Claims, 4 Drawing Sheets

CERAMIC METAL HALIDE LAMP

CROSS REFERENCE OF RELATED APPLICATION

This is a continuation-in-part application that claims priority to U.S. non-provisional application, application Ser. No. 15/368,654, filed Dec. 4, 2016, the entire contents of each of which are expressly incorporated herein by reference.

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to a ceramic metal halide lamp, and more particularly to a double-ended ceramic metal halide lamp which can provide a high wattage ceramic metal halide lamp.

Description of Related Arts

High intensity discharge lamps, such as HPS, MH, and LED, are commonly used in large area lighting application, and especially for the indoor growers, the above mentioned HID lamps are commonly used to grow corps without using sunlight indoors. In the current market, the ceramic metal halide lamps are provided in the market which can be used to provide efficient crop light that allows more harvest for less power. Compared with the other HID lamps, the ceramic metal halide lamps can be operated at higher temperature which is adapted to boost performance and quality-of-light characteristics, such as lumen maintenance, lamp color-shift and spread stability, color rendering index, and dimming.

However, the ceramic metal halide lamps have several drawbacks. Since the ceramic metal halide lamps are operated under a high temperature, throughout their lifetime, the light output of the ceramic metal halide lamps is gradually reduced, and the power consumption is gradually increased. Therefore, 315 W ceramic metal halide lamps are commonly used and limited in our daily life, and a higher wattage ceramic metal halide lamp is highly desired to provide to satisfy our daily life requirement.

SUMMARY OF THE PRESENT INVENTION

The invention is advantageous in that it provides a double-ended ceramic metal halide lamp which comprises at least two illuminators serially connected with each other to provide a high wattage lamp without alter the overall structure for the conventional high intensity discharge lamp.

Another advantage of the invention is to provide a double-ended ceramic metal halide lamp, wherein the illuminators are 315 W ceramic metal halide lamp, so a total wattage of all illuminators is 945 W.

Another advantage of the invention is to provide a double-ended ceramic metal halide lamp which comprises a plurality of U-shaped connectors arranged on two opposed ends of each illuminators to provide buffering clearances and buffering forces for connections between two illuminators.

Another advantage of the invention is to provide a double-ended ceramic metal halide lamp which comprises at least two getters attached on one of two U-shaped connectors between the two illuminators to absorb excess hydrogen, so as to protect the functions of the double-ended ceramic metal halide lamp.

Another advantage of the invention is to provide a double-ended ceramic metal halide lamp which comprises at least two ring-shaped retainers extended through one of the U-shaped connectors to an adjacent U-shaped connectors to bias against an inner wall of the luminous tube to support the illuminators arranged along a central line of the luminous tube.

Another advantage of the invention is to provide a double-ended ceramic metal halide lamp, wherein two opposed ends of the luminous tube are sealed and a vacuum space is formed inside the luminous tube to protect functions of the illuminators.

Another advantage of the invention is to provide a double-ended ceramic metal halide lamp, wherein the overall structure of the double-ended ceramic metal halide lamp doesn't nor alter in order to satisfy the above mentioned advantages, so there is no need to purchase new ballasts and fixtures for replacing the original lamp device into the present invention.

Additional advantages and features of the invention will become apparent from the description which follows, and may be realized by means of the instrumentalities and combinations particular point out in the appended claims.

According to the present invention, the foregoing and other objects and advantages are attained by a double-ended ceramic metal halide lamp, comprising:

a luminous tube;

at least two illuminators serially connected with each other deposed inside the luminous tube; and at least one ring-shaped retainers arranged between two illuminators to support said illuminators located along a central line of the luminous tube.

In accordance with another aspect of the invention, the present invention comprises a manufacturing method for a double-ended ceramic metal halide lamp, comprising following steps:

(1) Arrange at least two serially connected illuminators inside an interior of a luminous tube;

(2) Seal two ends of luminous tube by a press sealing technique; and (3) Extract out the gas inside the luminous tube to form an eyelet at a central portion of the luminous tube.

In accordance with another aspect of the invention, the present invention comprises:

a luminous tube;

an illuminating arrangement having at least two illuminators serially connected with each other and deposed inside the luminous tube; and at least one retainer having at least one contacting end being contacted with an inner surface of the luminous tube to support the illuminators being stability located at a predetermined position inside the luminous tube.

In accordance with another aspect of the invention, the present invention comprises:

a luminous tube;

a supporting frame having at least one end being contacted to an inner surface of the luminous tube; and an illuminating arrangement suspended inside the luminous tube through the supporting frame.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Figure 1:
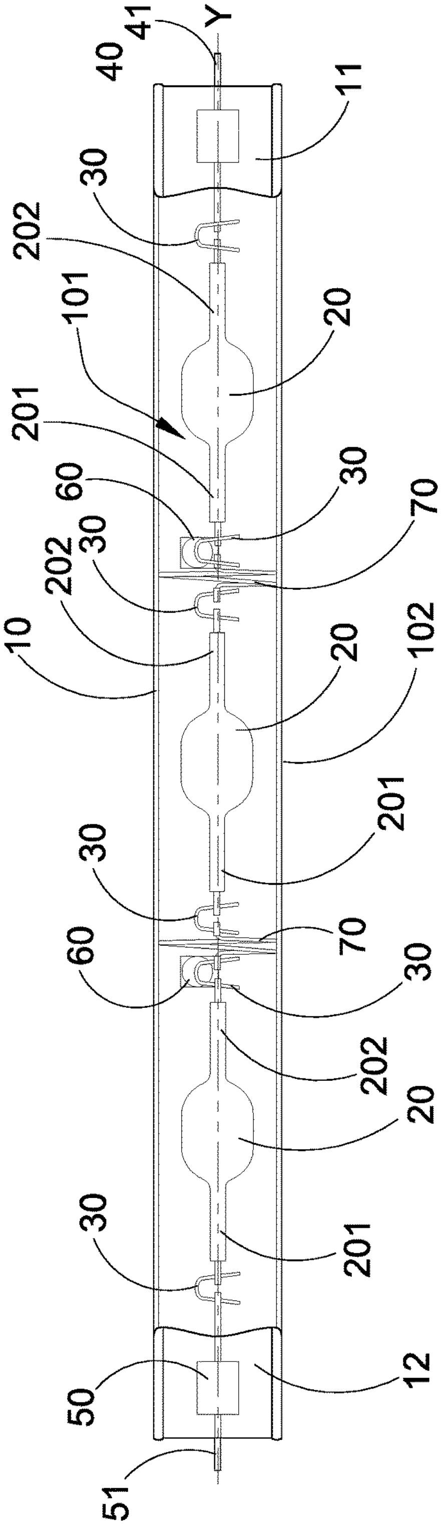
FIG. 1 is a perspective view of a double-ended ceramic halide lamp according to a first preferred embodiment of the present invention.
Figure 2:
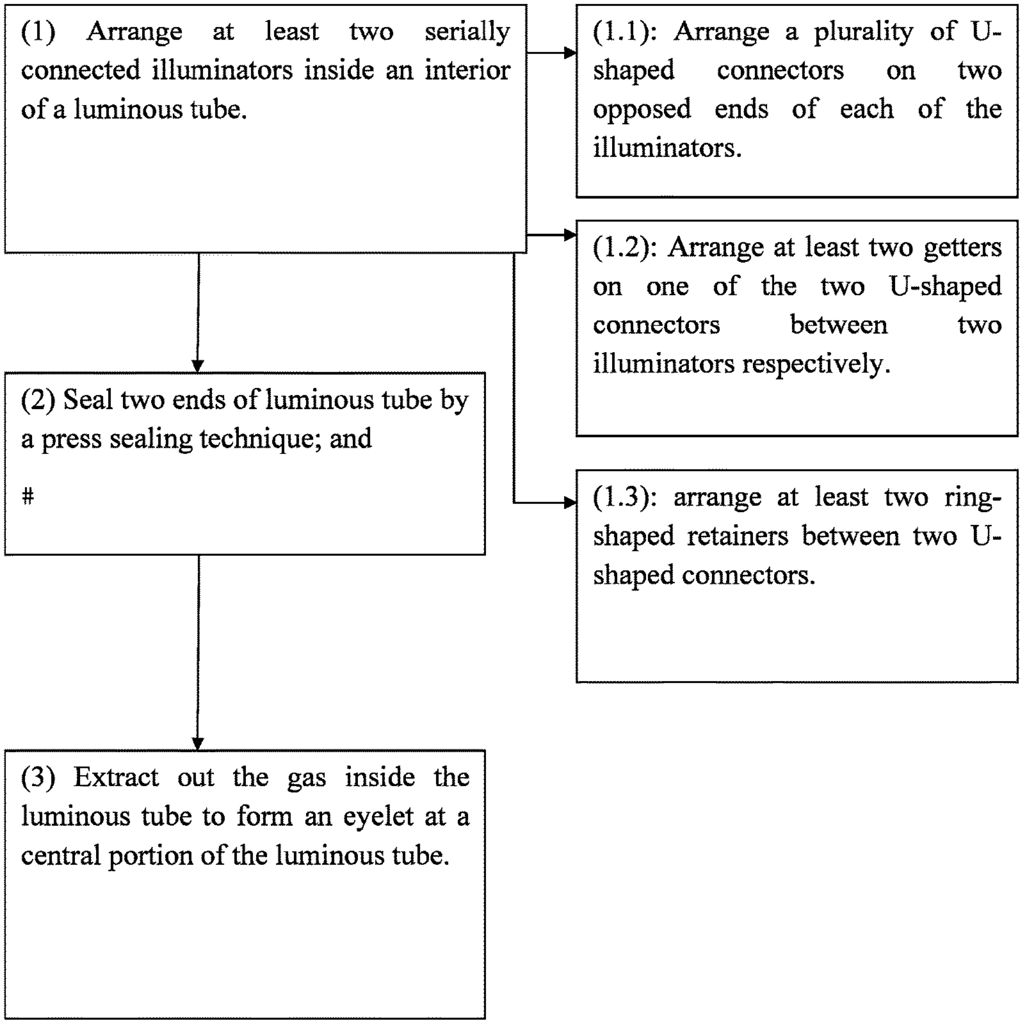
FIG. 2 is a block diagram of a manufacturing method for a double-ended ceramic halide lamp according to a second preferred embodiment of the present invention.

Referring to FIG. 1 of the drawings, a double-ended ceramic metal halide lamp according to a first preferred embodiment of the present invention is illustrated, wherein the double ended ceramic metal halide lamp comprises a luminous tube 10 having two sealed ends 11, 12 to define an interior 101, at least two illuminators 20 serially connected arranged along a central line Y of the luminous tube 10 and deposed inside the interior 101, and at least four U-shaped connectors 30 adapted to provide electrical connection between each of the illuminators 20.

Accordingly, each of the illuminators 20 is arc-tube having a wall formed of a ceramic or other suitable material, wherein each of the illuminators 20 has two opposed ends 201, 202 to receive current from the U-shaped conductors 30. The illuminators 20 are surrounded by the luminous tube 10, and two sealed ends 11, 12 of the luminous tube 10 are selectively connected with a source of power, such as voltage, wherein each of the illuminators 20 are conventional ceramic metal halide lamps, which comprises an ionizable fill disposed in an interior space of the illuminator 20, the ionizable fill comprising an inert gas and a halide component, and two electrodes positioned within the discharge vessel so as to energize the fill when an electric current is applied thereto. It is worth to mention that each of the illuminators 20 is a 315 W ceramic metal halide lamp, so if three of the illuminators 20 are serially connected with each other, the total energy used of the present invention is 945 W.

It is worth mentioning that the interior of the luminous tube 10 is a vacuum space to insulate the illuminators 20, so after the two sealed ends 11, 12 are sealed by press sealing technique, the gas inside the interior of the luminous tube 10 is extracted out to form the vacuum space from a central of the luminous tube 10 to from an eyelet. The press sealing techniques are well known in the art. And, each of the two sealed ends 11, 12 of the luminous tubes 10 is formed as a square tab adapted to engage with a socket of a lamp holder of an external fixture. It is worth to mention that the structure of the luminous tube 10 is the same as the conventional 1000 W high pressure sodium lamp, so the double-ended ceramic metal halide of the present invention can be installed on the ballast and fixture designed for the conventional 100 W high pressure sodium lamp, so no additional ballasts and fixtures are required to purchase in order to replace the 1000 W high pressure sodium lamp to 945 W double-ended ceramic metal lamps.

The ceramic metal halide lamp further comprises a first terminal 40 and a second terminal 50 formed on two sealed ends 11, 12 of the luminous tubes 10, and two electrical leads 41, 51 are extended from the two opposed ends 201, 202 of the illuminators 20 through the first and second terminals 40, 50 respectively. The two electrodes of each of the illuminators 20 are serially connected with each other to form the two opposed ends 201, 202 of the illuminators, and are connected through the two sealed ends 11, 12 of the luminous tubes 10 to two electrical leads 41, 51 respectively.

Accordingly, the U-shaped connectors 30 are arranged on two opposed ends 201, 202 of each of the illuminators 20, wherein each of the U-shaped connectors 30 provides a buffering clearance between the two illuminators 20, so a buffering force is provided from each of the U-shaped connector 30. During the manufacturing of the ceramic metal halide lamp of the present invention, the U-shaped connectors 30 are adapted to reinforce serially connections between each of the illuminators 20, and further prevent the break of the connections between each of the illuminators 20 due to the buffering force generated from the U-shaped connectors 30.

The ceramic metal halide lamp further comprises at least two getters 60, wherein each of the getters 60 is arranged between two illuminators 20 and attached on one of the U-shaped connectors 30 arranged between two illuminators 20. Therefore, the U-shaped connectors 30 can define a supporting surface to provide the getters 60 attached thereon, and the getters 60 are adapted to absorb excess hydrogen, so as to protect the function of the ceramic metal halide lamp of the present invention.

Accordingly, the ceramic metal halide lamp further comprises at least two ring-shaped retainers 70 connected between two U-shaped connectors 30, wherein each of ring-shaped retainers 70 is extended through one of the U-shaped connectors 30 to the other of the U-shaped connectors 30 to bias against an inner wall of the luminous tube 20. In order to prevent the damage of the illuminators 20 and the luminous tube 10, the illuminators 20 are required to arrange along a central line of the luminous tube 10, so the ring-shaped retainers 70 are adapted to support the illuminators 20 arranged along the central line of the luminous tube.

A manufacturing method for a ceramic metal halide lamp according to a second preferred embodiment of the present invention is illustrated, wherein the manufacturing method comprises following steps:

(1) Arrange at least two serially connected illuminators 20 inside an interior of a luminous tube 10;

(2) Seal two ends of luminous tube 10 by a press sealing technique; and (3) Extract out the gas inside the luminous tube 10 to form an eyelet 102 at a central portion of the luminous tube 10.

In the step (1), the illuminators 10 are arc-tubes, which are ceramic hadlide discharge tube, and which comprises an ionizable fill disposed in an interior space of the illuminators 20, the ionizable fill comprising an inert gas and a halide component, and two electrodes positioned within the discharge vessel so as to energize the fill when an electric current is applied thereto.

Accordingly, the manufacturing method further comprises a step (1.1): Arrange a plurality of U-shaped connectors 30 on two opposed ends of each of the illuminators 20, wherein the U-shaped connectors 30 not only provide electrical connection between each of the illuminators 20, but also provide buffering clearances between the two illuminators 20, so a buffering force is provided from each of the U-shaped connectors 30. During the manufacturing of the ceramic metal halide lamp of the present invention, the U-shaped connectors 30 are adapted to reinforce serially connections between each of the illuminators 20, and further prevent the break of the connections between each of the illuminators 20 due to the buffering force generated from the U-shaped connectors 30.

Accordingly, the manufacturing method further comprises a step (1.2): Arrange at least two getters 60 on one of the two U-shaped connectors 30 between two illuminators 20 respectively. Therefore, the U-shaped connectors 30 can define a supporting surface to provide the getters 60 attached thereon, and the getters 60 are adapted to absorb excess hydrogen, so as to protect the function of the ceramic metal halide lamp of the present invention.

Accordingly, the manufacturing method further comprises a step (1.3): arrange at least two ring-shaped retainers 70 between two U-shaped connectors 30, wherein each of ring-shaped retainers 70 is extended through one of the U-shaped connectors 30 to the adjacent U-shaped connectors 30 to be biased against an inner wall of the luminous tube 10. In order to prevent the damage of the illuminators 20 and the luminous tube 10, the illuminators 20 are required to arrange along a central line of the luminous tube 10, so the ring-shaped retainers 70 are adapted to support the illuminators 20 arranged along the central line of the luminous tube 10.

In the step (2), each of the illuminators 20 has two opposed ends 201, 202 to receive current from the U-shaped conductors 30. The illuminators 20 are surrounded by the luminous tube 10, and two sealed ends 11, 12 of the luminous tube 10 are selectively connected with a source of power, such as voltage.

In the step (2), each of the two sealed ends 11, 12 of the luminous tubes 10 are formed as square tabs adapted to engage with a socket of a lamp holder of an external fixture. The press sealing techniques are well known in the art.

In the step (3), the interior of the luminous tube 10 is a vacuum space to insulate the illuminators.

Figure 3:
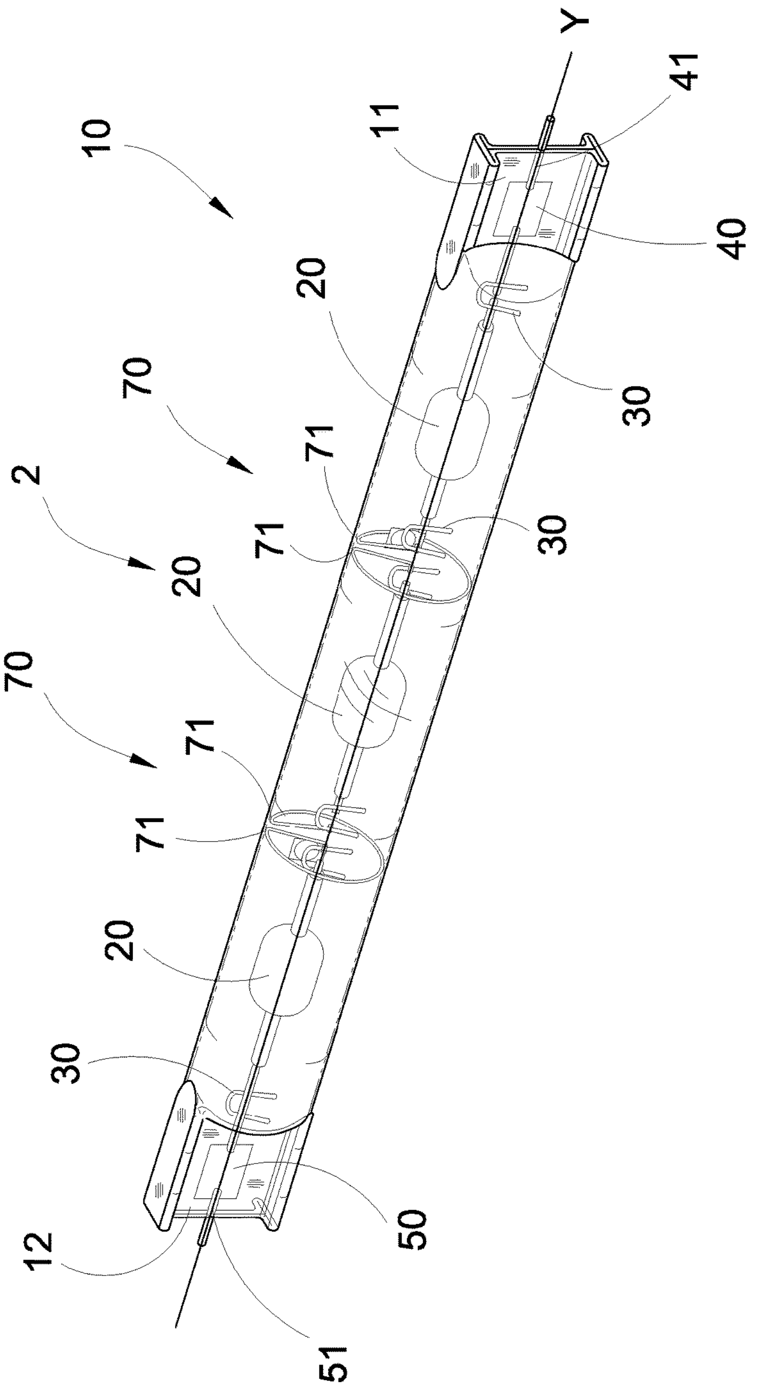
FIG. 3 is a perspective view of the ceramic metal halide lamp according to the above mentioned first preferred embodiment of the present invention.

As shown in FIG. 3, the ceramic metal halide lamp comprises a luminous tube 10 having two shrink sealed ends 11, 12, an illuminating arrangement 2 having at least two illuminators 20 serially connected arranged along a central line Y of the luminous tube 10 and deposed inside the luminous tube 10, and at least two U-shaped connectors 30 arranged on two side ends of the illuminating arrangement 2 for guiding the current to the illuminating arrangement 2.

The ceramic metal halide lamp further comprises a first terminal 40 and a second terminal 50 formed on two sealed ends 11, 12 of the luminous tubes 10, and two electrical leads 41, 51 are embedded inside the two sealed ends 11, 12 respectively through the first and second terminals 40, 50 respectively. The U-shaped connectors 30 are adapted to connect two side ends of the illuminating arrangement 2 with the two electrical leads 41, 51, wherein the U-shaped connectors 30 is not only adapted to guide the current into the illuminating arrangement 2, but also to provide buffering clearances between the illuminating arrangement and the two seal ends 11, 12. It is worth to mention that the U-shaped connectors 30 can provide a better connection effect comparing with that the illuminating arrangement 2 is directly welded with the electrical leads 41, 51. In other word, the buffering clearances of the U-shaped connectors 30 can provide bouncing forces between the illuminating arrangement 2 and the electrical leads 41, 51 while external pulling forces are applied on the electrical leads 41, 51, and at the same time, the connections between the illuminating arrangement 2 and the electrical leads 41, 51 are not easily broken by the enhancement of the U-shaped connectors 30.

Accordingly, the ceramic metal halide lamp further comprises at least one retainer 70 arranged between two illuminators 20, wherein each of the retainers 70 comprises at least one contacting end 71 being selectively contacted with an inner surface of the luminous tube 10 to support the illuminators 20 being remained at a predetermine position inside the luminous tube. Preferably, the illuminators 20 are arranged along the central line Y of the luminous tube 10. Each of the retainers 70 is radially extended from one end of the illuminator 20 towards the inner surface of the luminous tube 10 to contact with the inner surface of the luminous tube 10 to form the contacting end 71. In other words, the retainer 70 can be extended from two ends of two adjacent illuminators 20, wherein one end of the retainer 70 is extended from one end of one illuminator 20 to form the contacting end 71, and the other end of the retainer 70 is extended from one end of the other illuminator 20 to form the contacting end 71. Therefore, there are two ends 71 are contacted with the inner surface of the illuminous tube 10 to support the illuminators 20 being remained at a predetermined position inside the luminous tube.

Figure 4:
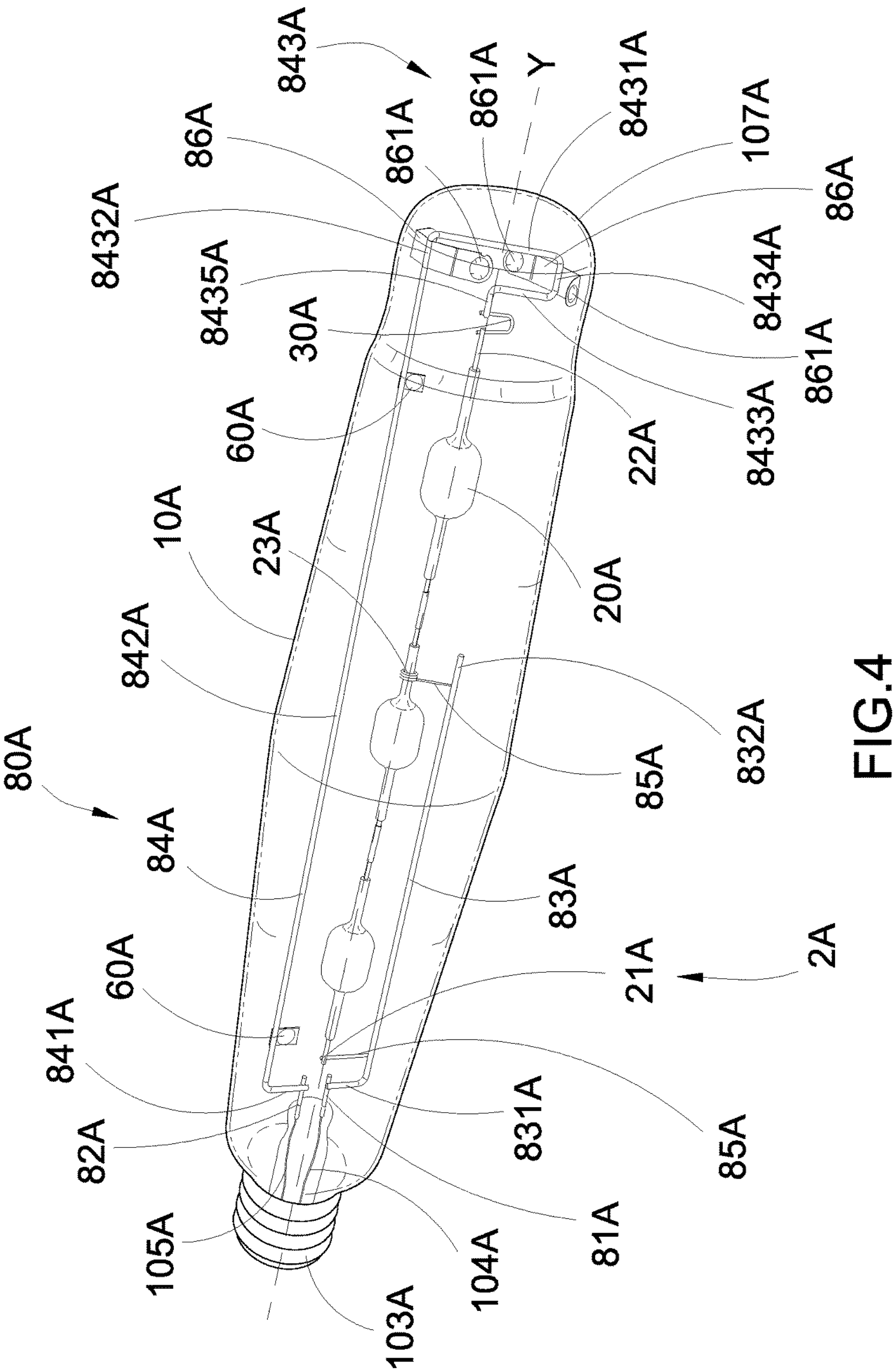
FIG. 4 is a perspective view of a ceramic metal halide lamp according to a third preferred embodiment of the present invention.

Referring to FIG. 4 of the drawings, a ceramic metal halide lamp according to a third preferred embodiment of the present invention is illustrated, wherein the ceramic metal halide lamp comprises a luminous tube 10A, an illuminating arrangement 2A having at least two illuminators 20A serially connected with each other and deposed inside the luminous tube 10A, and a supporting frame 80A having at least one end contacted with an inner surface of the luminous tube 10A to support the illuminators 20A suspending inside the luminous tube 10A.

Accordingly, the luminous tube 10A comprises at least one a socket base 103A formed on one end of the luminous tube 10A, a pair of led wires, a first led wire 104A and a second led wire 105A, electrically connected with the socket base 103, a stem tube 106A where the first and second led wire 104A, 105A are embedded therein and having one end extended from the socket base 103A, and a closed tube end 107A oppositely formed from the socket base 103A. It is worth to mention that the stem tube 106A is made of hard and heat-resistant glass and has a predetermined thickness, wherein the led wires 104A, 105A is isolated by embedding inside the stem tube 106A without being exposed under the heat energy discharged from the illuminators 20A while the illuminators 20A are activated to result illuminating effects, so the led wires 104A, 105A can be protected inside the stem tube 106A. In addition, the illuminators 20 can be securely affixed inside the luminous tube 10A by the stem tube 106A. Since the illuminators 20A are electrically connected with the led wires 104, 105A through the supporting frame 80A, the other end of the stem tube 106A is connected with the supporting frame 80A to affix the supporting frame 80A on the socket base 103A. Therefore, the stem tube 106A is adapted to support the supporting frame 80A being remaining at an affixed position and a not-shakable situation on the socket base 103A, based on the sturdy structure thereof.

The supporting frame 80A comprises a first and a second supporting member 81A, 82A connected with the first and second led wire 104A, 105A respectively and protruded from the stem tube 106A, a first wire frame member 83A welded with the first supporting member 81A, and a second wire frame member 84A welded with the second supporting member 82A, wherein the first wire frame member 83 A comprises a horizontally extended first upright portion 831A welded on the first supporting member 81A towards a direction and a first lateral portion 832A transversely and integrally extended from the first upright portion 831A, wherein the second wire frame member 84A comprises a horizontally extended second upright portion 841A welded on the second supporting member 82A towards an opposite direction, a second lateral portion 842A transversely and integrally extended from the second upright portion 841A, a loop portion 843A extended from the second lateral portion 842A.

The illuminating arrangement 2A comprises a free end 21A and a lamp connecting end 22A connected with the loop portion 843A of the second wire frame member 84A. The loop portion 843A comprises an loop upright 8431A horizontally extended from the second lateral portion 842A to form an angle portion 8432A, a U-shaped middle portion 8435A extended from the loop upright 8431A, and a wire frame connecting portion 8435A transversely and integrally extended from the U-shaped middle portion 8435A to connect with the lamp connecting end 22A of the illuminating arrangement 2A. Preferably, the angle portion 8432A has a right angle.

Accordingly, the supporting frame 80A further comprises at least one elongated metal sheet 86A affixed on the angle portion 8432A and the U-shaped middle portion 8434A, wherein the metal sheet is a spring sheet having two bouncing ends 861A selectively contacted with the inner surface of the luminous tube 10A. The metal sheet is adapted to provide a bouncing force between the metal sheet 86A and the inner surface of the luminous tube 10A, wherein the at least one of the two bouncing ends 861A is selectively contacted with the inner surface of the luminous tube 10A while the ceramic metal halide lamp of the present invention is shook. Therefore, the luminous tube 10A is not directly collided by the supporting frame 80 while the supporting frame 80A is synchronously shaking with respect to the shaking of the entire ceramic metal halide lamp, and at the same time, bouncing forces are provided by the two bouncing ends 861A to support the supporting frame 80A being reinstated to its original position.

In other words, either the angle portion 8432A or the U-shaped middle portion 8435A of the supporting frame 80A is selectively contacted with the inner surface of the luminous tube 10A through the two bouncing ends 861A of one of the metal sheets 86A. Alternatively, both of the angle portion 8432A and the U-shaped middle portion 8435A are contacted with the inner surface of the luminous tube 10A, and in the other words, either one of the two bouncing ends 861A or both of the two bouncing ends 861A of the two metal sheets 86A affixed on the angle portion 8432A and the U-shaped middle portion 8435A are contacted with the inner surface of the luminous tube 10A.

Alternatively, either the angle portion 8432A or the U-shaped middle portion 8435A of the supporting frame 80A is selectively flipped on the inner surface of the luminous tube 10A through the two bouncing ends 861A of one of the metal sheets 86A. In the other hands, both of the angle portion 8432A and the U-shaped middle portion 8435A are flipped on the inner surface of the luminous tube 10A, and in the other words, either one of the two bouncing ends 861A or both of the two bouncing ends 861A of the two metal sheets 86A affixed on the angle portion 8432A and the U-shaped middle portion 8435A are flipped on the inner surface of the luminous tube 10A.

The supporting frame 80A further comprises at least one mounting member 85A horizontally extended from the first lateral portion 832A to affix on a predetermined position of the illuminating arrangement 2A, wherein the predetermined portion can be a free end 21A of the illuminating arrangement 2A. In addition, the mounting member 85A can be affixed on the predetermined position 23A of the illuminating arrangement 2 which can ensure the illuminating arrangement 2A be securely suspended inside the luminous tube 10A through the supporting frame 80A in a balance situation. Preferably, the predetermined portion can be a middle portion of the illuminating arrangement 2A. In other words, the illuminating arrangement 20A is connected with the supporting frame 80A by the mounting member 86A through at least two points, wherein one point of the at least two points is where an free end of the first lateral portion 832A and the predetermined position 23A of the illuminating arrangement 2A is connected at, and the other point of the at least two points is where the lamp connecting end 22A of the illuminating arrangement 2 and the loop portion 843A is connected at. It is worth to mention that the illuminating arrangement 2A is suspended between the first wire frame member 83A and the second wire frame member 84A.

The supporting frame 80A further comprises an U-shaped connector 30A arranged between the lamp connecting end 22A of the illuminating arrangement 2A and the wire frame connecting portion 8434A of the loop portion 834A, wherein the U-shaped connector 30A provides a buffering clearance between the illuminating arrangement 2A and the loop portion 834A. The U-shaped connector 30A is adapted to reinforce the connection between the illuminating arrangement 2A and the loop portion 834A of the supporting frame 80A, and further prevent the break of the connection therebetween while ceramic metal halide lamp of the present invention is shaking or collided during the transportation.

Preferably, the supporting frame 80A is arranged along a central line Y of the luminous tube 10A. In other hand, the illuminating arrangement 2A is arranged and suspended by the supporting frame 80A along the central line of the luminous tube 10A. It is worth mentioning that the illuminating arrangement 2A is located and suspended between the first and second wire frame member 83A, 84A in a balance situation. Therefore, the illuminating arrangement 2A can be securely protected by the supporting frame 80A along a central line of the luminous tube 10A without being collided by the luminous tube 10A during the seriously shaking of the present invention, and two bouncing ends 861A of the supporting frame 80A also can provide the bouncing forces between the supporting frame 80A and the luminous tube 10A, so that the supporting frame 80A can be maintained in a safe and stable position.

The ceramic metal halide lamp further comprises at least one getter 60A arranged on the supporting frame 80A, wherein the getter 60A is arranged on the second wire frame member 84A. Preferably, there are two getters 60A arranged on two side of the second wire frame member 84A of the supporting frame 80A for absorbing excess hydrogen inside the luminous tube 10A.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A ceramic metal halide lamp, comprising:

a luminous tube;

an illuminating arrangement having at least two illuminators serially connected with each other and deposed inside said luminous tube; and at least one retainer having at least one contacting end being contacted with an inner surface of said luminous tube to support said illuminators being stably located at a predetermined position inside said luminous tube, wherein each of said retainer comprises one end radially extended from one end of one illuminator to form said contacting end being contacted with the inner surface of said luminous tube, and the other end of said retainer is radially extended from one end of the other adjacent illuminator to form said contacting end being contacted with the inner surface of said illuminous tube.

2. A ceramic metal halide lamp, comprising, a luminous tube comprising at least one socket base arranged on one end of said luminous tube and two lead wires;

a supporting frame having at least one end being contacted to an inner surface of said luminous tube and comprising two supporting members, a first wire frame member and a second wire frame member, wherein said two lead wires are electrically connected with said socket base to electrically connect with said supporting frame, wherein said first wire frame member comprises a first upright portion horizontally extended and connected with one of said supporting members and a first lateral portion transversely extended from said first upright portion; and an illuminating arrangement being suspended inside said luminous tube through said supporting frame, wherein said two supporting members are electrically connected with said two lead wires respectively to guide a current from said socket base to said illuminating arrangement, said first wire frame member and said second wire frame member are connected with said two supporting members respectively to support said illuminating arrangement suspended thereon.

3. The ceramic metal halide lamp, as recited in claim 2, wherein said second frame member comprises a second upright portion horizontally extended and welded on one of said supporting members, a second lateral portion transversely extended from said second upright portion, and a loop portion extended from said second lateral portion to connect with said illuminating arrangement.

4. The ceramic metal halide lamp, as recited in claim 3, wherein said loop portion comprises a loop upright horizontally extended from said second lateral portion to form an angle portion, a U-shaped middle portion extended from said first upright portion, and two metal sheets affixed on said angle portion and said U-shaped middle portion respectively.

5. The ceramic metal halide lamp, as recited in claim 4, wherein said metal sheets are spring sheets having two bouncing ends being selectively contacted with the inner surface of said luminous tube to provide bouncing forces between said loop portion and said luminous tube.

6. The ceramic metal halide lamp, as recited in claim 4, wherein said loop portion further comprises a wire frame connecting portion transversely extended from said U-shaped middle portion to connect with said lamp connecting end of said illuminating arrangement.

7. The ceramic metal halide lamp, as recited in claim 6, wherein said supporting frame further comprises a U-shaped connector for connecting said loop portion with said lamp connecting end of said illuminating arrangement.

* * * * *